March 22, 1966   S. B. THOMAS   3,241,303
COTTON GLEANER
Filed Aug. 7, 1964
FIG. 1
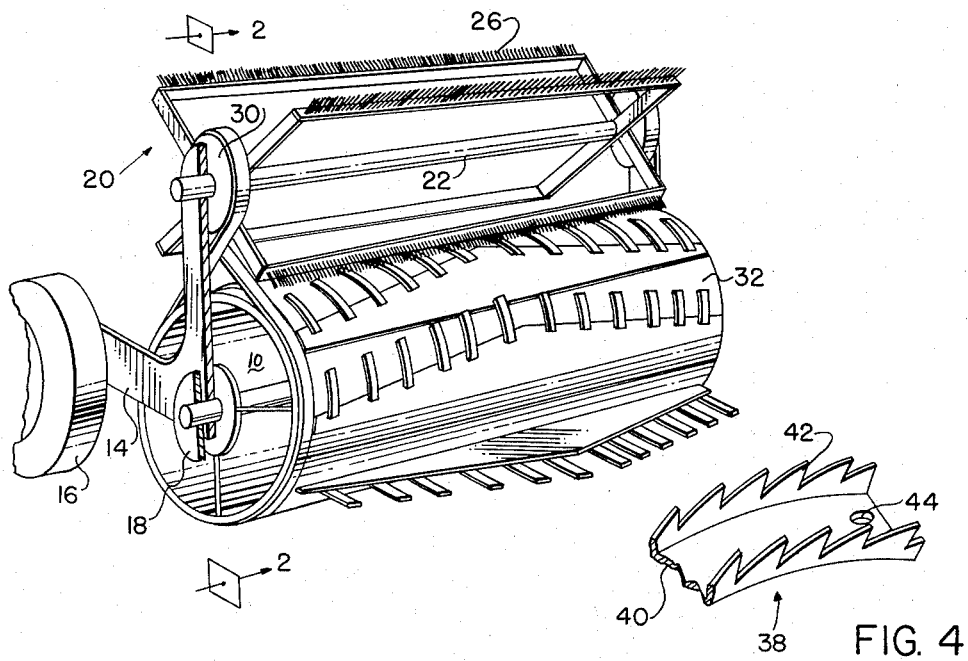
FIG. 2
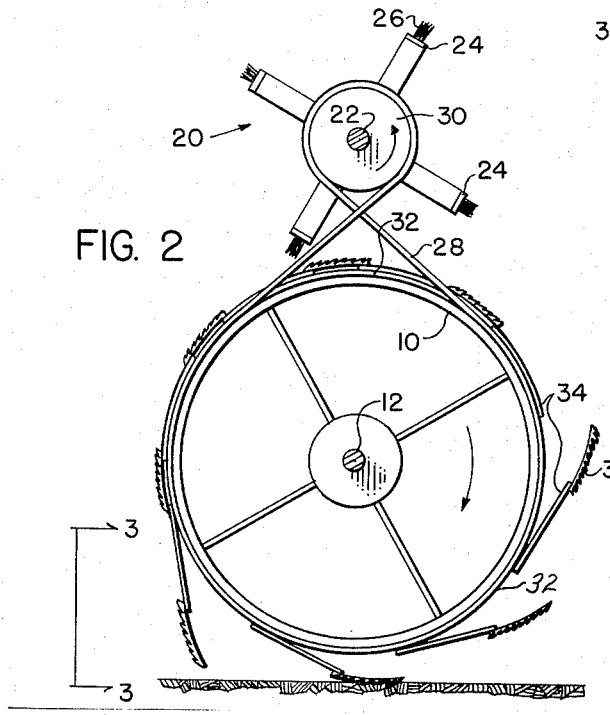
FIG. 3
FIG. 4
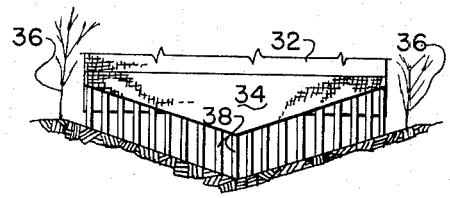
SID  B.  THOMAS
INVENTOR.
BY:

United States Patent Office 3,241,303
Patented Mar. 22, 1966

3,241,303
COTTON GLEANER
Sid B. Thomas, Box 594, Lockney, Tex.
Filed Aug. 7, 1964, Ser. No. 388,181
13 Claims. (Cl. 56—28)

This application is a continuation-in-part of my previous patent application filed January 17, 1962, Serial No. 166,892, now abandoned.

This invention relates to cotton gleaners and more particularly to machines for snagging or impaling loose cotton lying on the ground after mechanical harvesting.

There has been developed a particular type or class of machines for gleaning cotton as shown in my prior patent issued January 17, 1956, Patent No. 2,730,855 and the patent to Buell, August 23, 1955; 2,715,809. A machine of this particular class carries a rotating drum adapted to carry saw strips having a plurality of teeth for impaling cotton to be picked up. I have discovered that it is extremely critical that the saw strips drag the ground quite lightly. It is necessary that they be suspended with relation to the ground so that they contact the ground fully but lightly.

I have invented a particular attachment of the saw strip to the drum achieving this. According to my invention a pliable fabric belt encircles the drum including a plurality of attached pliable fabric flaps. These flaps are shaped in the same shape as the contour of the ground over which the gleaner passes so that the saw strips which are attached to the edge of the flap lightly contact the ground throughout the travel.

An object of this invention is to provide a machine for gleaning cotton.

Another object of this invention is to provide a machine for lightly dragging saw strips over the ground for the purpose of gleaning cotton.

Still further objects are to achieve the above with a device that is sturdy, compact, durable, simple, and reliable, yet inexpensive and easy to manufacture and operate.

The specific nature of the invention as well as other objects, uses, and advantages thereof will clearly appear from the following description and from the accompanying drawing, the different views of which are not necessarily to the same scale in which:

FIG. 1 is a perspective view of the invention with parts broken away and shown in section.

FIG. 2 is a cross sectional view taken on plane 2—2 of FIG. 1.

FIG. 3 is a partial rear elevational view.

FIG. 4 is an enlarged partial perspective view of a saw strip.

Referring more particularly to the drawings, it may be seen that the drum 10 is a rigid cylindrical drum which is supported by shaft 12. The shaft 12 is journaled within frame 14 which is supported by ground engaging wheels 16. The drum 10 is mounted for rotation within frame 14 and also there are means (wheel 16) connected to the frame for moving the frame in a direction normal to the axis of rotation of the drum. Pulley 18 on the end of shaft 12 is a means for rotating the drum.

Doffing brush 20 is mounted onto the frame 14 for rotation about its axis. The doffing brush 20 includes a shaft 22 with a framework which supports four brush strips 24, each brush strip having a plurality of nylon bristles 26 extending from it. The doffing brush is rotated by drive belt 28 which encircles the drum 10 and pulley 30 upon shaft 22. The belt is crossed so that as the drum 10 rotates clockwise as the doffing brush rotates counter clockwise as seen by the arrows in FIG. 2. Also the peripheral speed of the bristles 26 is greater than the peripheral speed of the drum 10. Any cotton on the drum 10 will be doffed therefrom into a conveyor or hopper (not shown) in conventional manner.

The drum 10 is encircled with belt 32 of pliable fabric. This belt 32 extends the full length of the drum. I have found canvas to be a desirable fabric for construction of the belt 32. The belt 32 forms a loose fit around the drum 10. It does not necessarily sag at any point but it is loose enough so that if any part of the belt were to become caught the drum 10 slips within the belt 32 preventing damages. Also a loose fit aids in assembly and removal.

A plurality of pliable fabric flaps 34 form a portion of the belt 32. The flaps 34 extend away from the belt so that they almost drag the ground. These flaps are longer in the middle than they are on either end so that they fit the contour of the ground. This feature is particularly illustrated in FIG. 3. It will be understood that the shape of the flaps 34 would be varied according to locality. Some localities because of soil and irrigation conditions have the particular contour shown on FIG. 3. Other localities have a more of a U-shape configuration rather than the V-shape shown in FIG. 3. In such localities the flap 34 would be of U-shape correlative to the shape of the row. When I speak of the shape of the row I am speaking of the shape between rows of cotton stalks 36. Each drum 10 would extend between the rows of cotton stalks 36 and each drum would operate between adjacent rows. Normally there is a plurality of drums 10 mounted on a single frame 14; however, inasmuch as this is within the skill of craftsmen, there has been only one unit illustrated.

One edge of the flap 34 is attached to the loop portion of the belt 36. Saw strips 38 are attached to the other edge. Each saw strip is arcuate in shape and channel shaped in cross section (FIG. 4). Each strip 38 has a flat back or bottom 40 which is of the same curvature of the drum 10 so that it lays flat on the drum. Also from this flat back project two sides having a plurality of picks or teeth 42. It is these teeth 42 which snag or impale or spear the cotton locks which are on the ground between the rows of cotton 36. The saw strips 38 are common items of commerce and are commercially available on the market and are commonly used in conventional ginning equipment for the purpose of snagging or spearing or impaling locks of cotton. The back 40 is perforated by one or more holes 44 by which a rivet may be used to attach one end of the saw strip 38 to the edge of the flap 34. One end of the saw strip 38 is attached to the flap 34 while the other end of the saw strip is permitted to swing free.

Therefore it may be seen that I have provided an improved means for attaching means for impaling cotton to the drum 10 so that the means for impaling always ride lightly on the ground for improved impaling characteristics. It will be noted that the saw strips 38 are never forced by the weight of the drum 10 into the ground but they only ride lightly on the ground, dragging along the ground by their own weight. I have found this arrangement is highly desirable in successful gleaning of locks of cotton which are loose along between the rows of cotton 36 after it has been mechanically harvested.

It will be apparent that the embodiment shown is only exemplary and that various modification can be made in construction, materials, and arrangement within the scope of the invention as defined in the appended claims.

I claim as my invention:
1. In a cotton gleaner having
(a) a frame,
(b) a drum mounted for rotation on said frame,

(c) means for doffing cotton mounted on the frame adjacent the drum, and
(d) means on the frame for rotating said drum about its axis;

the improvement comprising:
(e) a pliable fabric belt encircling the drum,
(f) a pliable member attached to the fabric belt extending away from the drum so that it drags the ground,
(g) a plurality of elongated saw strips attached to the pliable member extending away from the drum,
(h) each saw strip attached at one end to the pliable member with the other end swinging free, and
(j) each saw strip having a plurality of teeth adapted to impale cotton, so that the saw strips lightly drag the ground to glean cotton and then are rotated by the drum to have the cotton doffed from them by said means for doffing.

2. The invention as defined in claim 1 wherein
(k) the saw strips are curved to fit the drum.

3. The invention as defined in claim 1 wherein
(k) the pliable member extending away from the drum is in the form of a flap attached at one edge to the belt.

4. The invention as defined in claim 3 wherein
(m) the flap is longer in the middle than on either end so that if fits the contour of the ground being gleaned.

5. A cotton gleaner comprising in combination:
(a) a frame,
(b) a drum mounted for rotation about its axis on said frame,
(c) means on the frame for rotating the drum about its axis,
(d) means connected to the frame for moving the frame in a direction normal to the axis of the drum,
(e) a pliable fabric belt encircling the drum,
(f) a pliable member attached to the fabric belt extending away from the drum so that it drags the ground,
(g) a plurality of elongated saw strips attached to the pliable member extending away from the drum,
(h) each saw strip attached at one end to the pliable member with the other end swinging free,
(j) each saw strip curved to fit the drum,
(k) each saw strip having a plurality of teeth adapted to impale cotton, and
(m) means on the frame for doffing cotton from the saw strips; so arranged and constructed that the saw strips drag lightly along the ground, impaling cotton on the teeth thus gleaning cotton from the ground, then said strips with cotton impaled thereon are rotated upward along the drum to the means for doffing where the cotton is removed from the teeth.

6. In a cotton gleaner having
(a) a frame,
(b) a drum mounted on the frame for rotation about its axis,
(c) means on the drum for impaling cotton, and
(d) a doffing brush mounted on the frame for rotation to doff cotton from the drum;

the improved connection of the means for impaling to the drum comprising:
(e) a pliable fabric belt loop encircling the drum,
(f) pliable fabric flaps having one edge
(g) attached to the belt loop so that the flaps hang away from the belt, and
(h) said means for impaling attached along the other edge of the flaps.

7. The invention as defined in claim 6 wherein
(j) said means for impaling are in the form of a plurality of saw strips each having a plurality of teeth, and
(k) each of said saw strips are curved to fit the drum.

8. The invention as defined in claim 7 wherein
(m) each of the saw strips are attached at one end of the saw strip to the edge of the flap, and the other end of the saw strip swings free.

9. The invention as defined in claim 6 wherein
(j) each of said flaps are longer in the middle than on either end so that it fits the contour of the ground being gleaned.

10. In a cotton gleaner having
(a) a frame,
(b) a drum mounted on the frame for rotation about its axis,
(c) means on the drum for impaling cotton, and
(d) a doffing brush mounted on the frame for rotation to doff cotton from the drum;

the improved connection of the means for impaling to the drum comprising:
(e) pliable fabric flaps having one edge
(f) attached to the drum so that the flaps hang away from the drum, and
(g) said means for impaling attached along the other edge of the flap.

11. The invention as defined in claim 10 wherein
(h) said means for impaling are in the form of a plurality of saw strips each having a plurality of teeth, and
(j) each of said saw strips are curved to fit the drum.

12. The invention as defined in claim 11 wherein
(k) each of the saw strips is attached at one end of the saw strip to the edge of the flap, and the other end of the saw strip swings free.

13. The invention as defined in claim 12 wherein
(m) each of said flaps is longer in the middle than on either end so that it fits the contour of the ground being gleaned.

References Cited by the Examiner

UNITED STATES PATENTS

| | | | |
|---|---|---|---|
| 1,558,924 | 10/1925 | Riggs | 56—328 |
| 1,650,796 | 11/1927 | Kellogg | 56—328 |
| 2,715,809 | 8/1955 | Buell | 56—28 |
| 2,730,855 | 1/1956 | Thomas | 56—28 |
| 3,105,340 | 10/1963 | Hewitt | 56—28 |

References Cited by the Applicant

UNITED STATES PATENTS

| | | |
|---|---|---|
| 1,558,924 | 10/1925 | Riggs. |
| 1,650,796 | 11/1927 | Kellogg. |
| 2,715,809 | 8/1955 | Buell. |
| 2,730,855 | 1/1956 | Thomas. |
| 2,928,224 | 3/1960 | Powell. |

ABRAHAM G. STONE, *Primary Examiner.*

RUSSEL R. KINSEY, *Examiner.*